United States Patent [19]

Wadensten

[11] Patent Number: 4,587,863
[45] Date of Patent: May 13, 1986

[54] VIBRATION DAMPENING APPARATUS FOR MOTOR ACTUATED ECCENTRIC FORCES

[76] Inventor: Theodore S. Wadensten, P.O. Box 8, Stilson Rd., Wyoming, R.I. 02898

[21] Appl. No.: 614,658

[22] Filed: May 29, 1984

Related U.S. Application Data

[63] Continuation of Ser. No. 418,404, Sep. 15, 1982, which is a continuation-in-part of Ser. No. 196,310, Oct. 14, 1980, abandoned.

[51] Int. Cl.$^4$ ............................................. F16H 33/10
[52] U.S. Cl. ..................................... 74/87; 248/638; 310/51; 310/81; 366/128
[58] Field of Search ........................ 74/87; 248/638; 366/128; 310/51, 81; 209/366.5

[56] References Cited

U.S. PATENT DOCUMENTS

| | | | |
|---|---|---|---|
| 1,798,580 | 3/1931 | Bill | 248/638 |
| 1,979,548 | 11/1934 | Horsch | 366/128 |
| 2,857,535 | 10/1958 | Knoeckel et al. | 310/81 |
| 3,026,781 | 3/1962 | Schafer | 74/87 X |
| 3,145,631 | 8/1964 | Green | 74/87 X |
| 3,177,731 | 4/1965 | Peterson | 74/87 |
| 3,210,579 | 10/1965 | Sonoda et al. | 310/81 |
| 3,365,032 | 1/1968 | Gorndt | 188/268 |
| 3,386,296 | 6/1968 | Matson | 74/87 |
| 3,396,294 | 8/1968 | Makino | 74/87 X |
| 3,566,710 | 3/1971 | Long | 74/574 X |

Primary Examiner—Gary L. Smith
Assistant Examiner—Rodney M. Lindsey
Attorney, Agent, or Firm—Ralph R. Roberts

[57] ABSTRACT

This invention pertains to induced vibration and the dampening of these vibrations in the motor means. Vibration induced by rotating a shaft having eccentric weight thereon has been used to produce all kinds of shaking apparatus including large car shakers in which the induced force may be as much as eight thousand two hundred pounds. These vibrations can be as much as five thousand six hundred vibrations per minute and can be used for huge bins and hoppers in which the capacity may be as much as one hundred fifty thousand pounds. Vibrators using air, electric or hydraulic motors can be tuned or adjusted to provide the desired results. Most of these vibrators using a tuned motor may be temporarily or permanently attached. Motor driven vibrators, as far as is known, transmits the vibrational force into the shaft of the motor. Said motors, which are usually standard off-the-shelf units have their rotor bearings designed for rotary motion rather than combined with or added vibratory force. This added vibratory force reduces the life expectancy of these motor bearings. This invention employs a rubber dampener and coupling device used between the motor output shaft and the support shaft carrying at least one eccentric weight. This resilient connector substantially eliminates all vibration transfer in the shafts. A vibration dampening apparatus device is also provided to prevent transmission of vibration forces from the independent housing to the motor housing.

3 Claims, 5 Drawing Figures

VIBRATION DAMPENING APPARATUS FOR MOTOR ACTUATED ECCENTRIC FORCES

CROSS REFERENCE TO RELATED APPLICATION

This is a continuing application of U.S. application Ser. No. 418,404, filed Sept. 15, 1982, which was a C-I-P of application Ser. No. 196,310, filed Oct. 14, 1980 now abandoned.

BACKGROUND OF THE INVENTION

1. Field of the Invention

With respect to the classification of art as established in and by the United States Patent Office, the present invention is believed to be in the general class entitled, "Machine Elements and Mechanisms" (Class 74), pertaining to vibration dampening apparatus.

2. Description of the Prior Art

The prior art having vibration damping devices is well established and vibration produced by eccentric weights is also very well known. In the present invention it is contemplated that the vibration equipment be carried either by a housing that is clamped or attached either for a short period of time or a semipermanent condition to a car shaker, screen or the like. It is to be noted in particular that motor means are known in which the vibrations are produced by one or more eccentric weights driven by a motor. Usually the motor actuating the vibration is adjustable in speed and is usually an "off-the-counter" type of equipment that is easily replaced by the customer. Conventionally these motors have bearings that carry the rotor and are adapted for standard use of the motor. Said conventional bearings are not designed to accept the constant eccentric force and vibrations when transferred to a rotor. If the vibration is delivered to said motor rotor it is also transferred to the bearing means in the motor housing which often has a deleterious effect on the bearings and then to the stator of the motor.

In the present invention the vibration force carried by a shaft is isolated from the motor rotor by a rubber-type coupling or shock mount. The motor housing is also carried by a shock absorbing mount so that any vibratory force by the rotating eccentric weight is not transferred to the motor housing. In this manner the induced vibration forces from the eccentric weight are not transferred to the motor either to the rotor shaft or to the motor housing. The result is that motors operating with the bearings that carry the rotor are not unduly stressed. The life of the bearings in the motor used in the vibration apparatus of this invention is substantially that of a like-sized motor used in conventional service.

SUMMARY OF THE INVENTION

This invention may be summarized, at least in part, with reference to its object. It is an object of this invention to provide, and it does provide, an eccentric weight carried on a shaft. This shaft is rotatable in bearings carried by a housing which may be temporarily or permanently attached to apparatus that is to be vibrated. The eccentric forces developed in said shaft are not transmitted to the motor rotor through the provision and use of a shock absorbing coupling device which substantially eliminates the transfer of vibration from the eccentric shaft to the motor rotor. Additionally, there is provided a securing means from the housing of the vibration device to the housing of the motor which includes a shock absorbing and vibration damping means which prevents or substantially eliminates any transmission of the vibration forces from the eccentric weight vibration housing to the connected and associated motor housing.

Essentially, the present invention provides a vibration force which is carried on a shaft in a housing. This force is revolved by a connected motor and the rotor is connected to said shaft by a rubber shock coupling which coupling may be commercial or may be a special coupling. Such a shaft coupling is used in the apparatus of the several embodiments shown. The shaft carrying this rotor is carried by anti-friction bearings and is connected to the shaft of the vibrator by resilient coupling means. The outer housing of the motor which carries the rotor on bearings within and by said housing is attached to the housing, retaining and containing the eccentric vibratory weight means. This resilient shock absorbing device damps and substantially eliminates the transfer of vibrations through the housing. The combination of said vibration absorbing or damping means eliminates any transfer or vibration forces through the shaft of the housing to the motor drive unit.

The embodiments represent vibratory units in which the vibrations are developed by eccentric weights carried on a shaft and on bearings within the housing. This independent housing may be secured by clamp-on means or may be permanently mounted for use in moving or shaking loose the loads such as those in a hopper or chute. The drive may develop as little as three thousand frequencies per minute and may provide forces as little as six to seven hundred pounds and as great as almost nine thousand pounds of force.

In addition to the above summary the following disclosure is detailed to insure adequacy and aid in understanding of the invention. This disclosure, however, is not intended to cover each new inventive concept no matter how it may later be disguised by variations in form ar additions of further improvements. For this reason there have been chosen specific embodiments of the vibration damping apparatus as adopted for use with motor actuated eccentric forces and showing a preferred means for constructing and assemblying said motor actuated units. These specific embodiments have been chosen for the purposes of illustration and description as shown in the accompanying drawings wherein:

BRIEF DESCRIPTION OF THE DRAWINGS

In the following description and in the claims various details are identified by specific means for convenience. These names are intended to be generic in their application. Corresponding reference characters refer to like members throughout the several figures of the drawings.

EMBODIMENT OF THE APPARATUS OF FIG. 1

Figure 1:
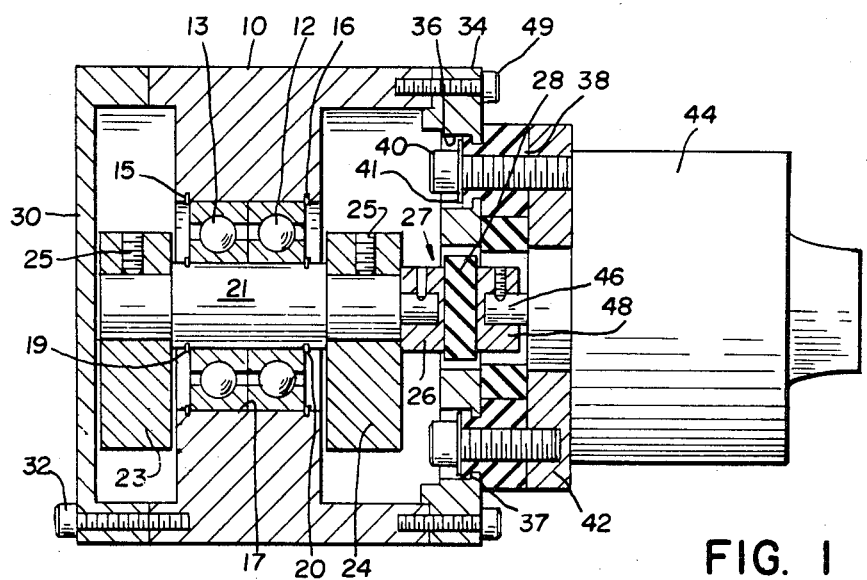
FIG. 1 represents a sectional side view, partly diagrammatic, and showing a vibratory means carried in a housing with the vibration forces being developed by two eccentric weights carried on a shaft, said shaft rotationally driven through a resilient coupling from an output shaft of a motor and with the motor housing attached to and through a resilient disk to the vibratory housing.

FIG. 1 shows vibration apparatus which includes a housing 10 bored to provide a finished seating surface for anti-friction bearings 12 and 13. This housing 10 becomes an independent housing for attachment to customer's apparatus and in this housing the developed vibratory forces are desirably isolated from the associated motor. Snap rings 15 and 16 retain these bearings in a finished bore 17 of the housing 10. Snap rings 19 and 20 retain these bearings in place along the shaft 21 carried by these bearings. This shaft may be shouldered to provide a seating surface for eccentric weights 23 and 24 which are preferably secured in place by set screws 25. Said set screws enter or engage flats or small recesses in the reduced shaft portions of shaft 21 so that the eccentric weights are precisely aligned and secured. The right end of the shaft 21 is further reduced in diameter for the mounting of a left half 26 thereon of a shock-absorbing coupling 27. This coupling is contemplated to be commercial with a resilient or rubber insert 28 in the center portion for a transfer of rotational force. Any commercial coupling that includes a resilient vibration damper may be used. A three piece flexible coupling 27 employs rigid left and right halves 26 and 48 each respectively secured to the end of shaft 21 or motor shaft 46. The resilient inserted portion 28 is interposed so as to preclude vibration transfer from shaft 21 to the motor shaft 46. The left half 26 of the housing 10 is closed by a cover 30 secured by cap screws 32. The right end of the housing 10 is exteriorly closed by a ring-type adaptor or end closure 34 which is formed with a plurality of inwardly recessed holes 36. Mounted in these recessed holes are molded protrusion portions 37 of a rubber ring or disk 38. This ring 38 is secured by cap screws 40 and washers 41 to a metal end adapter 42. This adapter is secured to the housing 44 of a motor. This metal adapter is a plate-like member attached to the motor housing 44 by cap screws 40. These cap screws pass through holes in protrusions 37 in rubber or resilient disk 38 and into threaded holes in adapter plate 42. The output of this motor is by a rotor shaft 46 which carries and has secured to said shaft a right half 48 of the coupling 27. Cap screws 49 secure said ring-type end closure 34 to the housing 10 as they are tightened in threaded apertures formed in the housing 10.

USE AND OPERATION OF THE EMBODIMENT OF FIG. 1

The vibration apparatus of FIG. 1 may employ any motor in which a rotor shaft is actuated. Motor means contemplated are hydraulic, pneumatic or electric and any motor that has a selected speed or selectably adjustable speed and the power to swing the eccentric weight or weights is suitable. To assemble, the bearings 12 and 13 are mounted in bore 17 and snap rings 15 and 16 secure and maintain these bearings in place. Snap rings 19 and 20 retain shaft 21 within the bearings. Eccentric weights 23 and 24 are secured to said shaft by set screws 25 which engage small flats or shallow holes formed on shaft 21. Cover 30 is secured in place by screws 32 which enter and are seated in threaded apertures in housing 10.

The left half 26 is now mounted and secured to the right end of the shaft. The rubber or resilient center insert 28 is now placed in position and the motor is now prepared for attachment. The right half 48 of the coupling is mounted on and secured to the rotor shaft 46 and adapter 42 is secured to the motor housing 44 or may be an integral portion thereof. The rubber or resilient ring portion 38 is now positioned with the protrusion portions 37 positioned and extending into holes 36. The cap screws 40 and washers 41 are now tightened to secure adapter 34 in place. The coupling 27 is now brought into rotational alignment with halves 26 and 48 in driving engagement with resilient or rubber insert 28. Cap screws 49 secure end closure 34 to the housing 10 after which connection is made for actuating the motor. The speed of the motor is adjusted for the desired vibratory force. The housing 10 is clamped to the member to be vibrated, either as a temporary attachment or a permanent attachment. The size and amount of vibratory force is a matter of selection and depends in a large part in the final use of the vibrator.

EMBODIMENT OF FIG. 2

Figure 2:
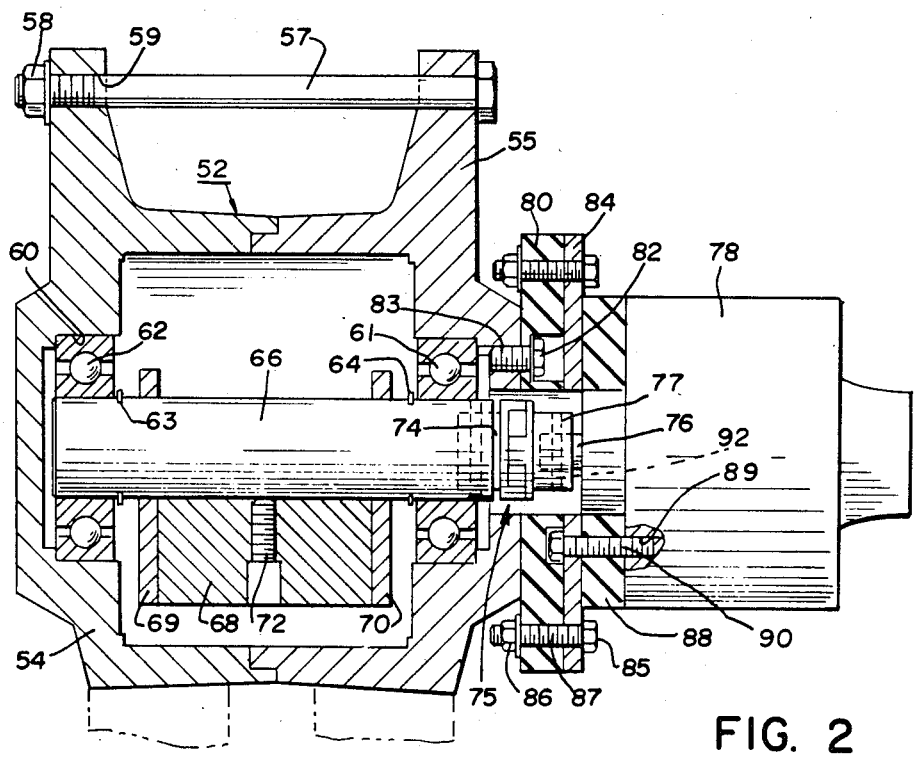
FIG. 2 represents a sectional side view, partly diagrammatic, and depicting a modification of the attachment of the motor housing to the housing of the vibration producing means.

In FIG. 2, there is shown an alternate embodiment to that of FIG. 1. As depicted in FIG. 2, the housing, the eccentric weight mass, the bearings in the eccentric housing and vibratory isolation of the motor are arranged differently. A housing 52 includes a left half 54 and a right half 55. These halves have a machined central portion providing a lap joint that not only insures alignment but also provides a more-or-less dust tight seal. These halves are brought together and are secured by bolts and nuts 57 and 58. The positioning and number of bolts is a matter of selection. These bolts are mounted in holes 59 formed in the extending ear portions of the halves 54 and 55. In each half is formed a finished and shouldered bore 60 for anti-friction bearings 61 and 62. Snap rings 63 and 64 retain these bearings in the bore. These rings are seated in appropriately formed and positioned grooves in and along shaft 66. Eccentric weight 68 is carried by end members 69 and 70 that are bored to slide on shaft 66. Set screws or screws 72 secure this eccentric weight on the shaft so that said weight is fixed to and rotated with the turning of the shaft.

The right end of shaft 66 is bored to receive a left half 74 of a vibratory isolation coupling 75 which is of commercial design. The coupling is secured to an output rotor end 76 secured to a right half 77 of said coupling 75. This coupling is rotated by a motor means 78 whose outer housing is isolated from vibrations from the eccentric weight housing. A rubber or resilient ring member 80 is secured to the right half 55 of the housing by cap screws 82 which pass through holes in this resilient ring member 80 and into threaded holes or apertures 83 in the housing right half 55. A metal ring 84 is positioned next to ring member 80 and is secured thereto by bolts and nuts 85 and 86 with the shank of said bolts passing through appropriately positioned and sized holes 87 in both the resilient ring member 80 and the metal ring 84. Another resilient ring-like member and isomode 88 is adjacent the housing of the motor 78. This resilient ring 88 is secured to the motor by cap screws 90 which pass through appropriately positioned and sized holes in both the metal ring 84 and the resilient ring 88 and into threaded apertures 89 in the motor housing. Appropriately formed recesses for the heads of the screws 82 and 90 are formed in the ring-like resilient member 80. Drive pins 92 may secure the coupling halves 74 and 77 to shaft 66 and the rotor end 76.

USE AND OPERATION OF THE APPARATUS OF FIG. 2

Assembly of the apparatus of FIG. 2 is somewhat like that of FIG. 1 but the housing for the eccentric weight is different and the securing of said eccentric housing to the motor housing is different. The bearings 61 and 62 are retained in finished bores in the halves 54 and 55. Shaft 66 is shown without shoulders, and with snap rings 63 and 64 retaining the shaft and bearings. A stepped shaft can also be provided to achieve the same result. Eccentric weight 68 is retained in place by a set screw 72 but other means such as keyways or flats may be provided. Spacers between the end members 69 and 70 and the snap rings may be provided. This eccentric weight depicts a single, heavier weight retained on the shaft 66 by members 69 and 70.

The vibratory isolation of the motor housing from the eccentric weight housing utilizes two resilient or rubber ring-like members. The metal ring 84 is utilized after ring member 80 is secured to the right half 55 by screws 82. This same resilient ring member also has localized recesses to accommodate the heads of the cap screws 90. These screws secure the resilient ring-like member 88 to the motor housing. Bolts and nuts 85 and 86 retain the metal ring 84 to the resilient ring 80.

It is to be noted that the coupling 75 insures that the vibrations from and in shaft 66 are not transmitted to the motor rotor. In a like manner, any vibrations of the eccentric weight housing are not transmitted to the motor housing. This insures that the conventional bearings in said motor means are not adversely affected by the eccentric weight operation or any vibrations produced thereby and therefrom.

ALTERNATE EMBODIMENT OF FIG. 3

Figure 3:
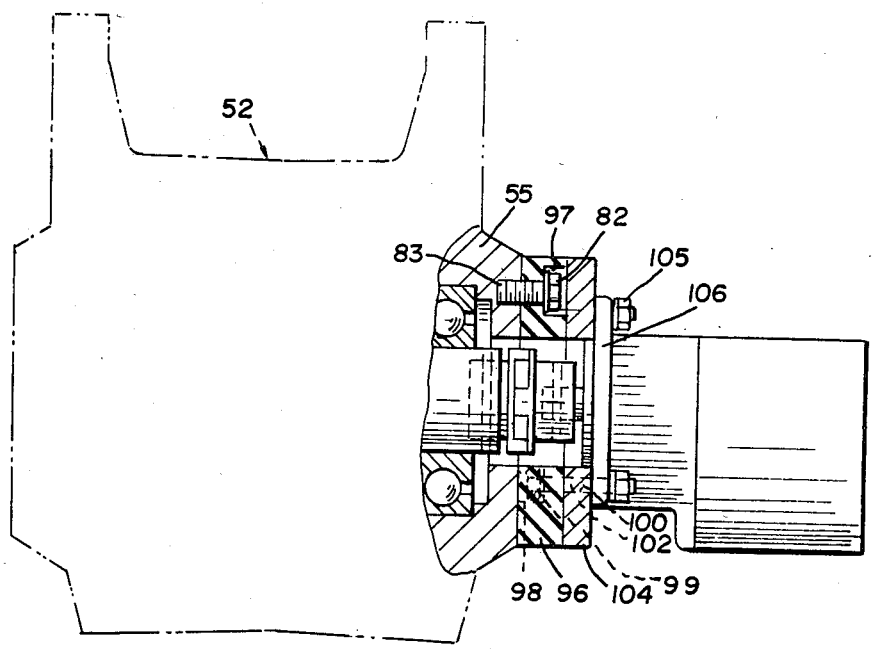
FIG. 3 represents a sectional side view, partly diagrammatic, and showing yet another means for attaching a motor housing to the housing carrying the vibration producing means.

In FIG. 3, the embodiment of FIG. 2 is contemplated as far as the vibratory apparatus but alternate motor housing vibratory isolation means is provided. The vibratory housing halves 54 and 55, the shaft 66 and weight 68 and the mounting thereof is similar to that of FIG. 2. Rather than two ring-like resilient members, this arrangement shows the right half 55 of the vibration housing using cap screws 82 and threaded holes 83 as above with a resilient ring-like member 96 molded to have shouldered holes 97 to receive these cap screws 82. This same ring-like member 96 is also provided with formed recesses 98 to receive and retain the heads of bolts 99 whose shank portions pass through holes 100 in the ring-like member 96 and through similarly spaced and sized holes 102 in adapter ring 104. Nuts 105 secure the bolts 99 to the motor housing flange 106.

USE AND OPERATION OF THE VIBRATOR EMBODIMENT OF FIG. 3

The vibration apparatus of FIG. 2 is employed in this suggested apparatus and the difference is in the means for securing the motor housing to the vibratory housing. This embodiment utilizes only a single resilient or rubber ring-like member 96. The motor and weight of the eccentric mass is a matter of selection.

EMBODIMENT OF FIGS. 4 AND 5

Figure 5:
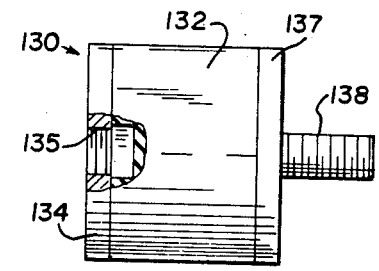
FIG. 5 represents a side view, partly diagrammatic, and showing an isomode isolator that is secured between the motor housing and the housing carrying the vibration means.
Figure 4:
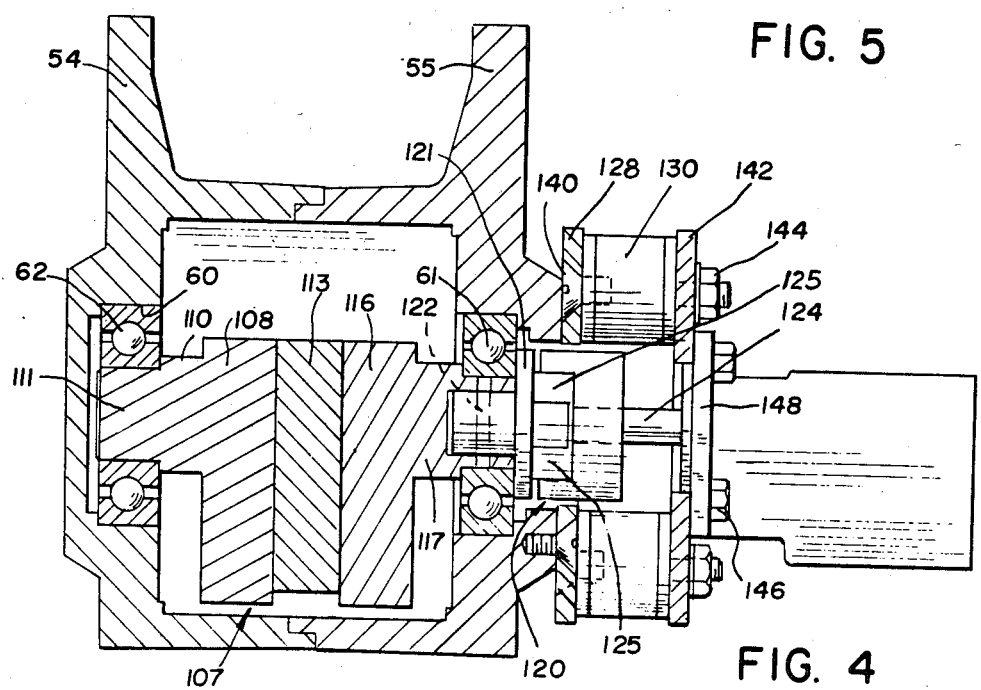
FIG. 4 represents a sectional side view, partly diagrammatic, and showing yet another means for attaching said motor housing to the housing carrying the vibration producing means.

Referring next and finally to FIGS. 4 and 5, there is depicted yet another alternate means and method of mounting and actuating a vibratory assembly in which the left and right halves 54 and 55 are as shown and described in FIG. 2. Bearings 61 and 62 are mounted in the bored recesses 60. Rather than snap rings, which may be provided, the eccentric weight 107 has a left member 108 having a shank portion 110 which is further reduced to provide a precision diameter shaft end 111.

This apparatus depicts a combination shaft and weight in which a central portion 113 is secured as by soldering or other means to a right end portion 116 which includes a shaft end portion 117 which is further reduced to provide a precision end diameter which is a tight fit in bearing 61. This eccentric weight may also be secured together by bolts or screws. The means of securing together is merely a matter of selection and provides a heavy eccentric weight. Bearings 61 and 62 are designed and selected to provide the capacity for the eccentric loads applied. The shoulders provided by left and right shank portions 110 and 117 position bearings 61 and 62 in the formed recesses 60 in the housing halves 54 and 55. Coupling 120 is of the vibration damping type and the left half 121 may be secured in a recess in shaft end portion 117 by a pin 122. The right half of coupling 120 is mounted on extending rotor shaft 124 of a motor means. The resilient center portion of the coupling is identified as 125.

A ring-like member 128 of metal is secured to right half 55 of the housing by cap screws 82, not shown in this view but shown and described in connection with FIG. 2. This ring-like member 128 is secured to isomodes 130 more fully seen in FIG. 5. Each isomode has a resilient cylindrical body portion 132. The left end is attached as by vulcanization to an end plate 134 which has a tapped hole 135 therethrough. The other end of each isomode has a metal plate member 137 with a stud 138 extending therefrom.

If mounted condition a plurality (three or more) of isomodes 130 are mounted and secured to a ring-like member 128 by flat head screws 140. A ring-like member 142 is secured to the isomodes 130 by positioning and passing studs 138 through appropriately formed holes and with and by tightening nuts 144 the member 142 is secured to the isomodes 130. Cap screws 146 secure the flange portion 148 of the motor to the ring-like member 142.

USE AND OPERATION OF EMBODIMENT OF FIGS. 4 AND 5

The shaft 117 which is a portion of the eccentric weight assembly generally identified as 107 provides the desired eccentric force. Bearings 61 and 62 are selected to accommodate the severe vibration load produced with the revolution of the eccentric weight. The coupling employs a resilient center 125 and may be any of the commercial types of units available. It is only necessary that any and all vibrations be isolated from the rotor 124 so that the bearings carrying the rotor not be affected by vibration forces. It is also necessary that these same vibratory forces or influences not be transmitted to the motor housing hence isomodes 130 are provided. These isomodes 130 prevent transfer of vibrations from the vibration housing to the motor housing.

In the above examples shown the vibration forces are developed by a rotating shaft. These vibratory forces are produced by an eccentric weight carried on said shaft. The shaft within the vibration housing is carried by bearings that have the desired capability of accepting the loads of the eccentric weight on the turned shaft. The transfer of these vibratory forces to the motor providing the turning force is avoided by utilizing a coupling which has a resilient member portion that isolates the vibrations in and along said shaft. At the same time it is desirable that the vibration forces not be transmitted to the motor housing. At least one resilient member is used to retain the motor housing and the vibratory housing in alignment and position. Each of the above embodiments provides resilient coupling means so that any vibrations in the eccentric weight housing are prevented from transmittal to the motor housing. By preventing undue vibratory forces from being transmitted to the motor the life of the bearings and of the motor itself is nearly normal. The above embodiments provide such a means for isolating the vibratory forces from reaching and adversely affecting the motor use and life.

Terms such as "left", "right", "up", "down", "bottom", "top", "front", "back", "in", "out" and the like are applicable to the embodiments shown and described in conjunction with the drawings. These terms are merely for the purposes of description and do not necessarily apply to the position in which the vibration damping apparatus may be constructed or used.

While particular embodiments of the vibration damping apparatus have been shown and described it is to be understood the invention is not limited thereto since modification may be made within the scope of the accompanying claims and protection is sought to the broadest extent the prior art allows.

What is claimed is:

1. A vibration damping apparatus for mechanism, said apparatus having at least one eccentric weight is carried on and by a rotating shaft isolated from transmitting vibrations to a motor rotating said shaft, the damping apparatus including:
   (a) an independent housing having a cavity within which at least one eccentric weight is adapted to be moved in a rotational orbit;
   (b) a support shaft rotatably carried within and by said independent housing;
   (c) at least one eccentric weight secured to said support shaft and rotated as the support shaft is rotated;
   (d) at least one anti-friction bearing carried in a precision bore portion of the independent housing, said anti-friction bearing in a mounted condition in said independent housing carrying said support shaft and secured eccentric weight or weights so that the forces of vibration created in the rotated support shaft are transmitted to the independent housing, said bearing having a capability for accommodating said forces of vibration;
   (e) a motor including a rotor and housing and for operational use positioned adjacent the independent housing;
   (f) a coupling half mounted and secured to that end of the support shaft nearest the motor rotor;
   (g) a resilient central portion in a mounted condition adapted to transmit torque as developed by said motor to the support shaft, with said resilient central portion substantially eliminating a transmission of vibration forces from said rotated shaft;
   (h) a second coupling half mounted on and secured to an output shaft of said motor, said coupling half adapted to engage said resilient central portion of the coupling, with the resilient central portion providing damping of vibrations from the rotation of the eccentric weight and substantially eliminating a transmittal of said forces from the support shaft to the motor shaft, said first coupling half, said resilient central portion and said second coupling half when assembled providing rotational alignment of said support shaft and motor rotor, and
   (i) a resilient ring-like member interposed between the motor housing and independent housing, said resilient ring-like member attached to the motor housing with a first arrangement of securing means as by bolts or cap screws and with said resilient ring-like member also secured to the independent housing by a second arrangement of securing means as by bolts or cap screws, said first and second arrangement of securing means independent of each other and the resilient ring-like member and in secured position providing a desired alignment and positioning of the support shaft and motor rotor, said interposed resilient ring-like member providing a damping of the vibration forces from transmittal from the independent housing to the motor housing and at this same time period the resilient coupling central portion damps transmittal of said vibration forces from the support shaft to the motor rotor, this damping of said vibration forces as developed within the independent housing to the secured and positioned motor, drastically reducing transmittal of said vibration forces so that excessive loads are not imposed on the motor rotor bearings carrying the rotor and thus preventing shortened life and a failure of said motor rotor bearings.

2. Vibration damping apparatus, as in claim 1, in which there are two eccentric weights which are mountable on said support shaft.

3. Vibration damping apparatus, as in claim 1, in which the motor speed is selectively variable.

* * * * *